United States Patent

(12) United States Patent
Damnjanovic et al.

(10) Patent No.: US 9,374,774 B2
(45) Date of Patent: Jun. 21, 2016

(54) WAN-WLAN CELL SELECTION IN UES

(71) Applicant: QUALCOMM Incorporated, San Diego, CA (US)

(72) Inventors: Jelena Damnjanovic, Del Mar, CA (US); Yongbin Wei, San Diego, CA (US); Dexu Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 14/098,279

(22) Filed: Dec. 5, 2013

(65) Prior Publication Data

US 2014/0169197 A1     Jun. 19, 2014

Related U.S. Application Data

(60) Provisional application No. 61/738,754, filed on Dec. 18, 2012.

(51) Int. Cl.
*H04L 12/26* (2006.01)
*H04W 48/18* (2009.01)
*H04W 48/16* (2009.01)
*H04W 28/06* (2009.01)
*H04W 28/08* (2009.01)
*H04W 84/04* (2009.01)
*H04W 84/12* (2009.01)

(52) U.S. Cl.
CPC .............. *H04W 48/18* (2013.01); *H04W 28/06* (2013.01); *H04W 28/08* (2013.01); *H04W 48/16* (2013.01); *H04W 84/04* (2013.01); *H04W 84/12* (2013.01)

(58) Field of Classification Search
USPC ........................................................ 370/252
See application file for complete search history.

(56) References Cited

U.S. PATENT DOCUMENTS 7,388,910 B2 *   6/2008   McKown ................. 375/232
7,738,379 B1 *   6/2010   Bakshi ..................... 370/235
(Continued)

FOREIGN PATENT DOCUMENTS

| WO | WO2006026890 | * | 3/2006 |
| WO | WO-2009024180 A1 | | 2/2009 |
| WO | WO-2011041926 A1 | | 4/2011 |
| WO | WO2013060807 | * | 5/2013 |

OTHER PUBLICATIONS

Garcia L G U, et al., "Autonomous component carrier selection: interference management in local area environments for LTE-advanced", IEEE Communications Magazine, IEEE Service Center, Piscataway, US, vol. 47, No. 9, Sep. 1, 2009, pp. 110-116, XP011283372, ISSN: 0163-6804, DOI: DOI:10.1109/MCOM.2009. 5277463.

(Continued)

*Primary Examiner* — Faruk Hamza
*Assistant Examiner* — Shah R Zaman
(74) *Attorney, Agent, or Firm* — Norton Rose Fulbright US LLP

(57) ABSTRACT

A selection process is disclosed for a user equipment (UE) to select between a WAN and a WLAN. Instead of defaulting to select one or the other networks, as long as the connection is available, a better load balancing and maximization of the system capacity may be achieved when the UE selects the network according to a priority order between the WAN/WLAN. The priority order takes into account various network metrics, such as loading, channel conditions, bandwidth, and service requirements.

28 Claims, 7 Drawing Sheets

(56) References Cited

U.S. PATENT DOCUMENTS

| | | | |
|---|---|---|---|
| 8,489,108 B2* | 7/2013 | Chan et al. | 455/453 |
| 2005/0037787 A1 | 2/2005 | Bachner et al. | |
| 2009/0265543 A1 | 10/2009 | Khetawat et al. | |
| 2010/0267386 A1* | 10/2010 | Lim et al. | 455/436 |
| 2013/0044760 A1* | 2/2013 | Harjanto | 370/401 |
| 2013/0083783 A1 | 4/2013 | Gupta et al. | |
| 2013/0142113 A1* | 6/2013 | Fong et al. | 370/328 |
| 2013/0163450 A1 | 6/2013 | Kreuchauf et al. | |
| 2013/0176952 A1* | 7/2013 | Shin et al. | 370/329 |
| 2014/0126401 A1* | 5/2014 | Motamed et al. | 370/252 |

OTHER PUBLICATIONS

International Search Report and Written Opinion—PCT/US2013/074041—ISA/EPO—Apr. 29, 2014.

Sivaraj R., et al., "Edge-prioritized channel-and traffic-aware uplink Carrier Aggregation in LTE—advanced systems", World of Wireless, Mobile and Multimedia Networks (WOWMOM), 2012 IEEE International Symposium on A, IEEE, Jun. 25, 2012, pp. 1-9, XP032220146, DOI: 10.1109/WOWMOM.2012.6263691 ISBN: 978-1-4673-1238-7 abstract paragraphs [001.]-[00V.].

\* cited by examiner

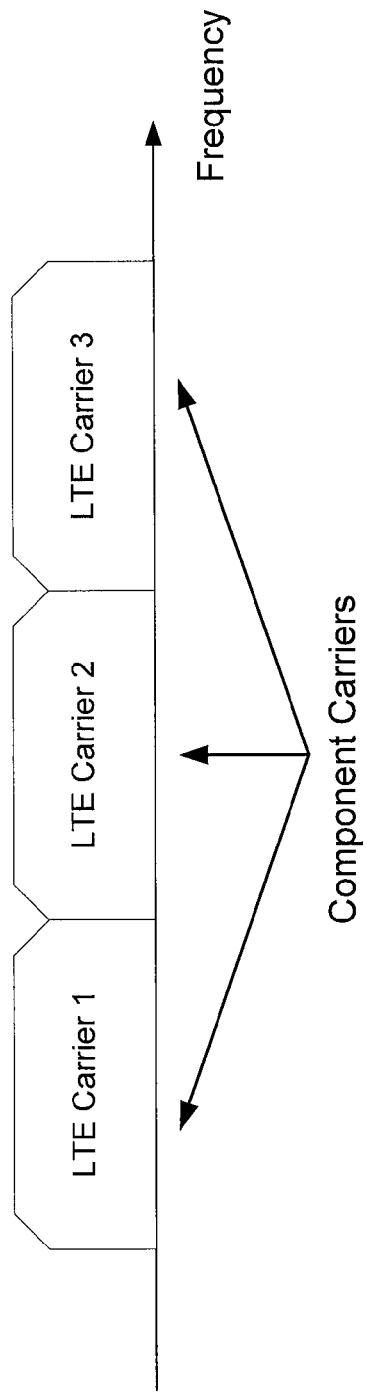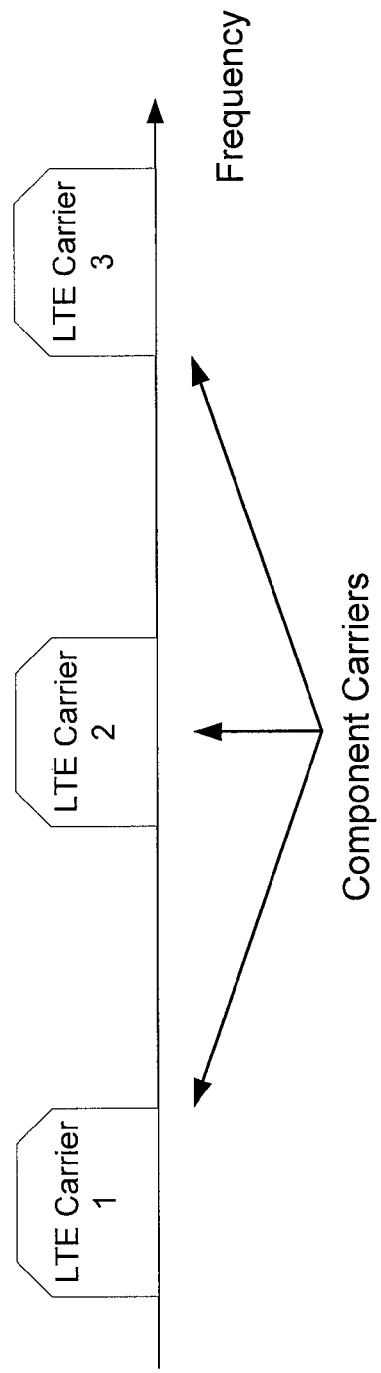
FIG. 3A
FIG. 3B

WAN-WLAN CELL SELECTION IN UES

CLAIM OF PRIORITY

The present application claims priority from U.S. Provisional Patent Application No. 61/738,754, filed on Dec. 18, 2012, and entitled "WAN-WLAN CELL SELECTION IN IDLE UES," the contents of which is incorporated herein by reference in its entirety.

BACKGROUND

1. Field

Aspects of the present disclosure relate generally to wireless communication systems, and more particularly, to wide area network (WAN)-wireless local area network (WLAN) cell selection by idle mode user equipments (UEs).

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grow with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

A UE in idle mode has a choice of selecting a wide area network (WAN) or a wireless local area network (WLAN), for example, that may be deployed by a network operator, to get connected. In many implementations, if the WLAN is available to the UE, the UE will default to connect to and camp on the WLAN. In general, WLAN, such as wireless networks implemented using WIFI™, BLUETOOTH™ or the like, may be less costly to operate. However, a UE will generally select to connect to the WLAN regardless of the channel quality or loading conditions of the WLAN.

SUMMARY

Various aspects of the present disclosure are directed to a selection process used by a UE to select between WAN and WLAN. Instead of defaulting to select the WLAN, as long as the connection is available, a better load balancing and maximization of the system capacity may be achieved when the UE priority order of choosing the WAN/WLAN takes into account loading, channel conditions, bandwidth, and service requirements.

Additional aspects of the present disclosure are directed to a method of wireless communication that includes detecting, at a mobile device, presence of one or more WANs and one or more WLANs, determining, by the mobile device, a connection probability for at least one of the one or more WANs and for at least one of the one or more WLANs, wherein the connection probability is based at least in part on network conditions, and selecting, by the mobile device, to connect to a network based, at least in part, on the connection probability, wherein the network is one of the one or more WANs and one or more WLANs.

Further aspects of the present disclosure are directed to a mobile device configured for wireless communication that includes means for detecting, at the mobile device, presence of one or more WANs and one or more WLANs, means for determining, by the mobile device, a connection probability for at least one of the one or more WANs and for at least one of the one or more WLANs, wherein the connection probability is based at least in part on network conditions, and means for selecting, by the mobile device, to connect to a network based, at least in part, on the connection probability, wherein the network is one of the one or more WANs and one or more WLANs.

Further aspects of the present disclosure are directed to a non-transitory computer-readable medium having program code stored thereon, wherein the program code, when executed by a computer, causes the computer to detect, at a mobile device, presence of one or more WANs and one or more WLANs, determine, by the mobile device, a connection probability for at least one of the one or more WANs and for at least one of the one or more WLANs, wherein the connection probability is based at least in part on network conditions, and select, by the mobile device, to connect to a network based, at least in part, on the connection probability, wherein the network is one of the one or more WANs and one or more WLANs.

Further aspects of the present disclosure are directed to a mobile device configured for wireless communication that includes at least one processor and a memory coupled to the processor. The processor is configured to detect, at the mobile device, presence of one or more WANs and one or more WLANs, determine, by the mobile device, a connection probability for at least one of the one or more WANs and for at least one of the one or more WLANs, wherein the connection probability is based at least in part on network conditions, and select, by the mobile device, to connect to a network based, at least in part, on the connection probability, wherein the network is one of the one or more WANs and one or more WLANs.

BRIEF DESCRIPTION OF THE DRAWINGS

FIG. 3A is a diagram illustrating a continuous carrier aggregation type.

FIG. 3B is a diagram illustrating a non-continuous carrier aggregation type.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
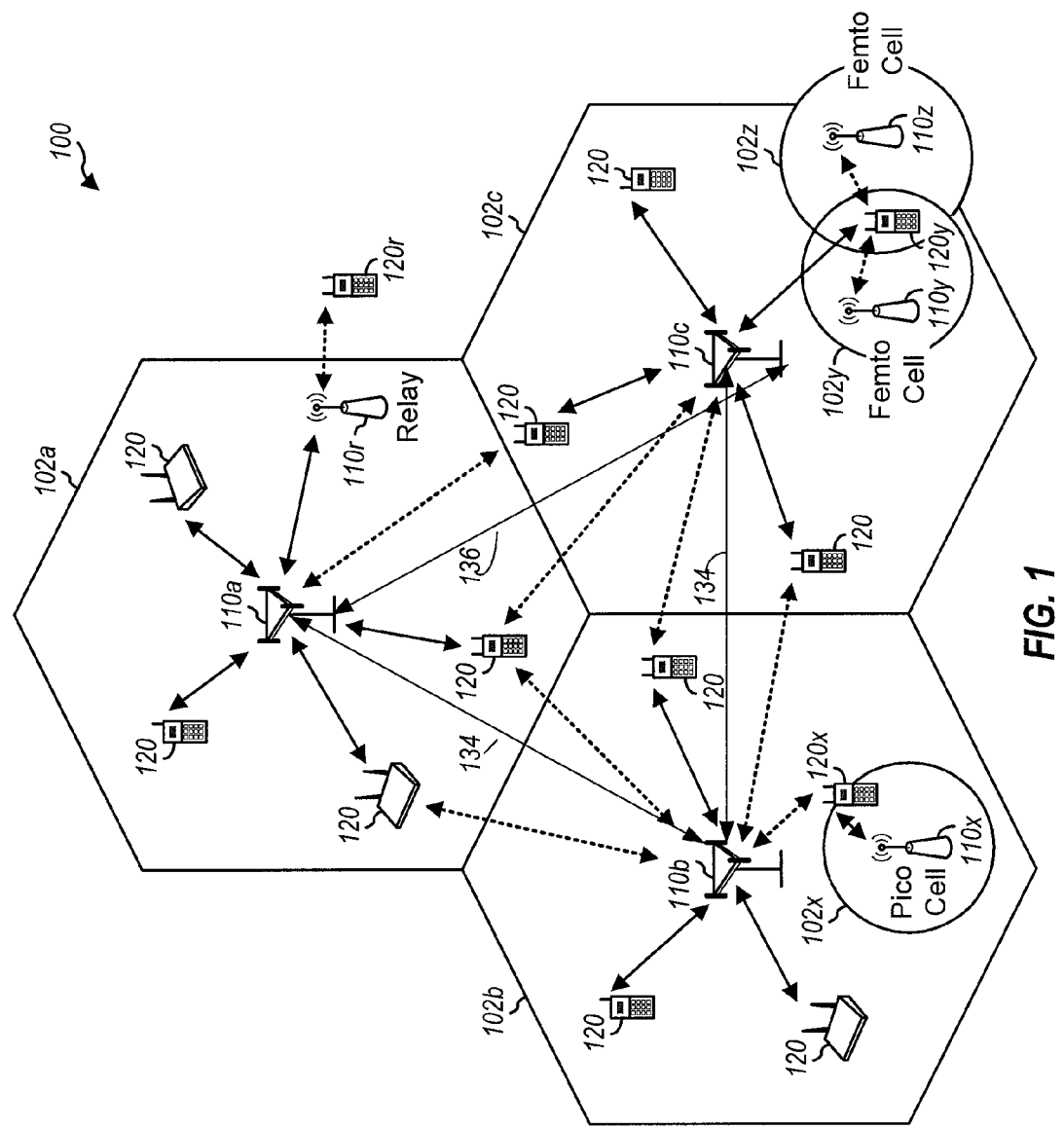
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a smart phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, 12, or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively), where A represents the adaptive, non-static assignment of such protected, prohibited, or common subframes. The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 2:
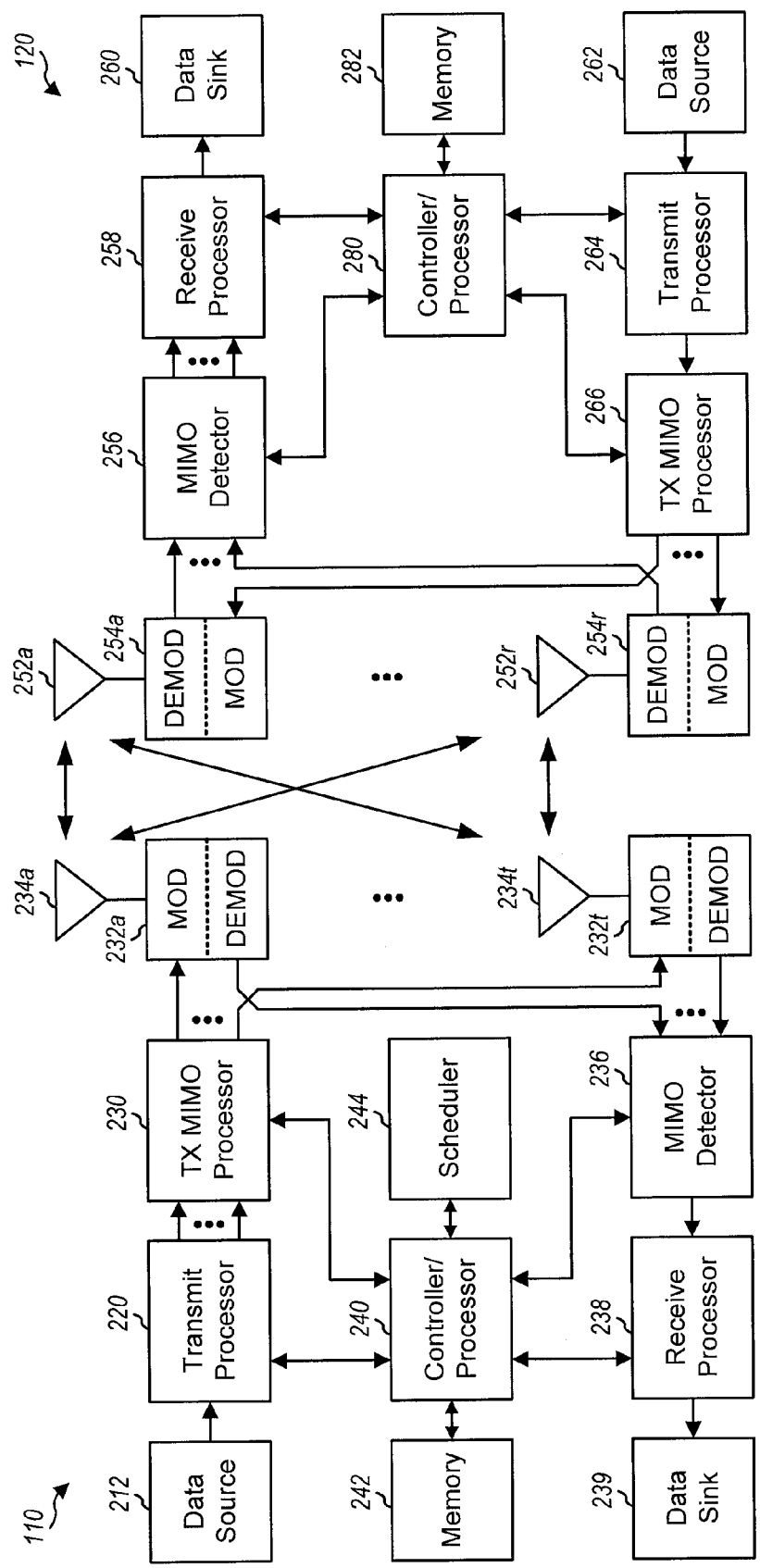
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 110. At the eNB 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 5 and 7, and/or other processes for the techniques described herein. The memories 242 and 282 may store data and program codes for the eNB 110 and the UE 120, respectively. A scheduler 244 may schedule UEs for data transmission on the downlink and/or uplink.

Carrier Aggregation

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Carrier Aggregation Types

For the LTE-Advanced mobile systems, two types of carrier aggregation (CA) methods have been proposed, continuous CA and non-continuous CA. They are illustrated in FIGS. 3A and 3B. Non-continuous CA occurs when multiple available component carriers are separated along the frequency band (FIG. 3B). On the other hand, continuous CA occurs when multiple available component carriers are adjacent to each other (FIG. 3A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UEs since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 4:
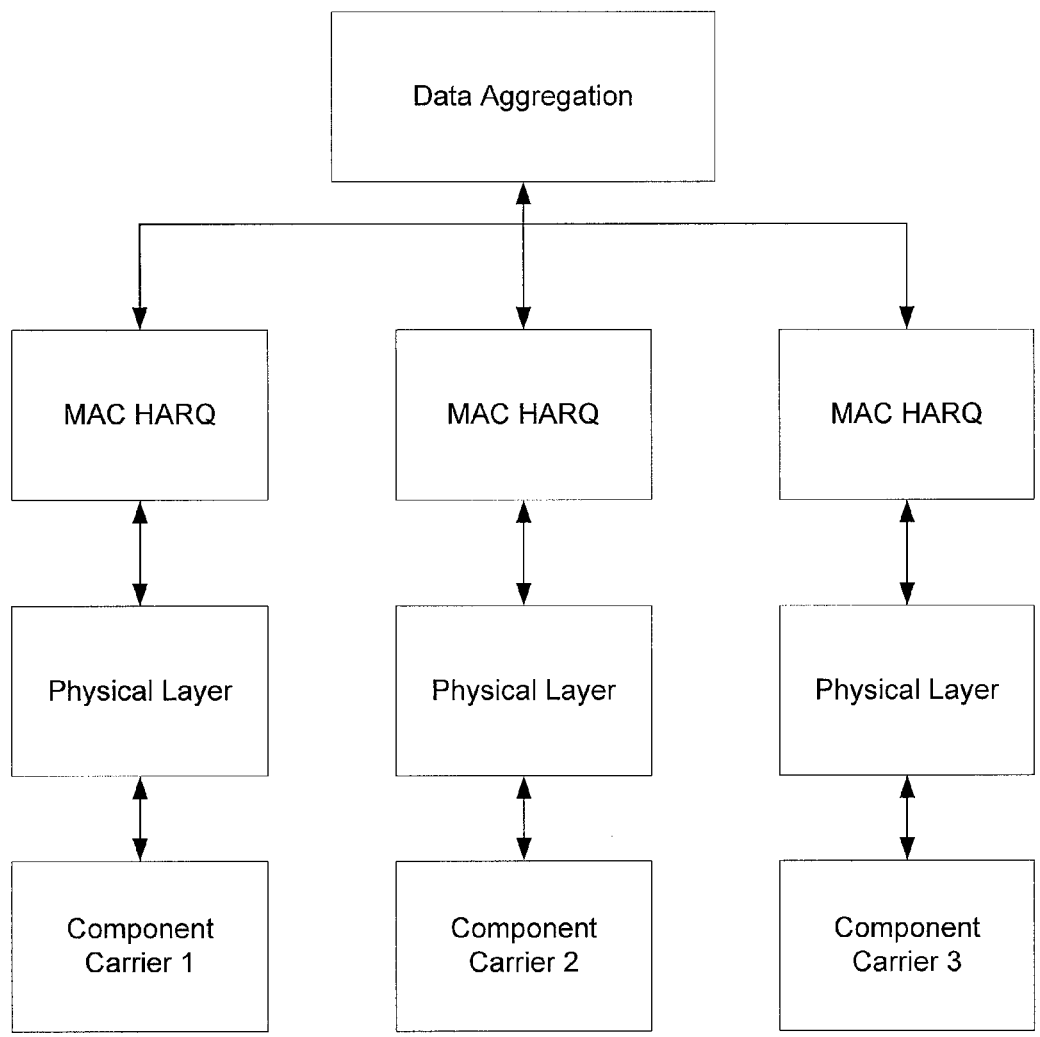
FIG. 4 is a diagram illustrating MAC layer data aggregation.

FIG. 4 illustrates aggregating transmission blocks (TBs) from different component carriers at the medium access control (MAC) layer (FIG. 4) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for an International Mobile Telecommunications (IMT)-Advanced UE. However, reserving sufficient system resources (e.g., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as described in the 3GPP technical specification 36.331 for the LTE RRC protocol.

Figure 5:
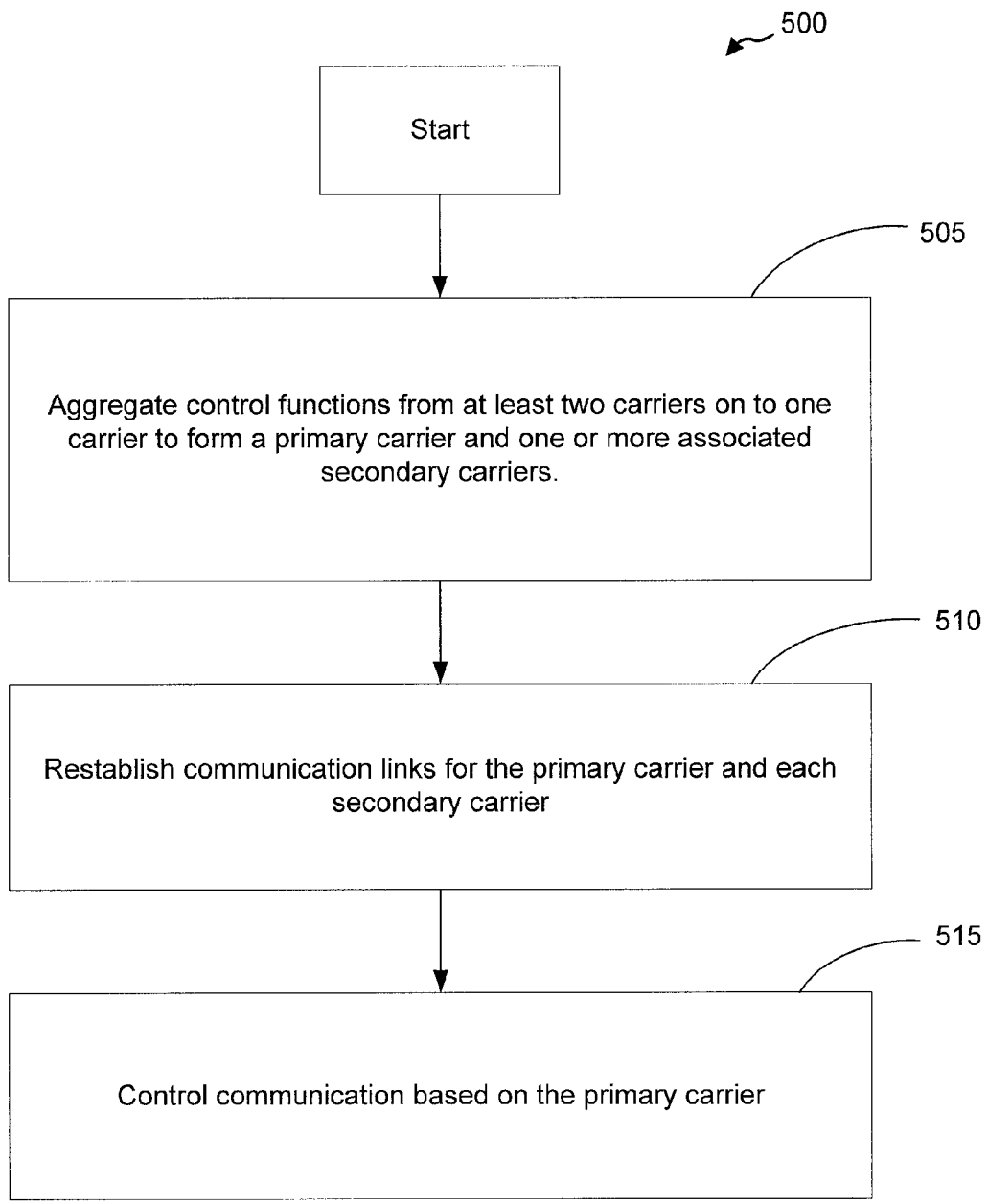
FIG. 5 is a functional block diagram illustrating example blocks executed for controlling radio links in multiple carrier configurations.

FIG. 5 illustrates a method 500 for controlling radio links in a multiple carrier wireless communication system by grouping physical channels according to one example. As shown, the method includes, at block 505, aggregating control functions from at least two carriers onto one carrier to form a primary carrier and one or more associated secondary carriers. Next at block, 510, communication links are established for the primary carrier and each secondary carrier. Then, communication is controlled based on the primary carrier in block 515.

WAN-WLAN Cell Selection

A UE in idle mode may have a choice of selecting WAN or WLAN, for example, as deployed by a network operator, commercial location, or the like, to get connected. In order to provide a good load balancing, the priority order for a UE to select one of these networks should take into account loading, channel conditions, bandwidth, and service requirements.

In one aspect of the present disclosure, a UE is configured to account for the various network conditions, such as account loading, cell loading, channel quality, bandwidth, service requirements, and the like, by determining a probability of connection to each of the WANs and/or WLANs that may be detected in the vicinity of the UE. The probability that a UE connects to a WAN/WLAN can be determined for each WAN and WLAN using a coefficient that is calculated according to the following equation:

$$\beta = (\alpha) \sum_{i=1}^{N_{CC}^{DL}} t_i^{DL} R_i^{DL} + (1-\alpha) \sum_{i=1}^{N_{CC}^{UL}} t_i^{UL} R_i^{UL} \quad (1)$$

Where $\alpha \in [0,1]$ is a parameter that considers UL/DL service requirements, such that the value of $\alpha$ determines whether the derivation of $\beta$ is related to DL or UL communication. For example, when $\alpha$ is set to 1, then the second part of equation (1), for the UL communications, resolves to 0, and when $\alpha$ is set to 0, then the first part of equation (1), for the DL communications resolves to 0. $N_{CC}^{DL}$ and $N_{CC}^{UL}$ are the maximum number of CCs that may be aggregated at the UE (as the minimum of the maximum number of CCs supported by the node/cell and the maximum CC capability of the UE) for DL and UL, respectively, as determined by $N_{CC}^{DL}$=min($N_{DL_{CC}max}^{UE}$, $N_{DL_{CC}max}^{Node}$) and $N_{CC}^{UL}$=min($N_{UL_{CC}max}^{UE}$, $N_{DL_{CC}max}^{Node}$). $1_i^{DL}$ and $1_i^{UL}$ are the loading coefficients for the DL and UL, respectively, of each carrier over the maximum CCs represented by $N_{CC}^{DL}$ or $N_{CC}^{UL}$. These loading coefficients may be provided by the network and represent the fraction or the overall DL/UL resources that are available, with a range of $l_i$ between 0 and 1. $R_i^{DL}$ and $R_i^{UL}$ are the maximum supportable data rates on the $i^{th}$ DL and UL carrier, respectively, of each carrier over the maximum CCs. These data rates may be a function of various signal metrics, such as pathloss, bandwidth, interference, and transmission power. In various aspects of the disclosure a UE will estimate the data rates using the reference signals received over the CCs and based on the signal metrics. The resulting $\beta$ coefficient will provide a level of representation of the capacity of the various WAN/WLAN networks.

It should be noted that, in selected versions of LTE, an idle mode UE is only a single CC UE. Accordingly, such an idle UE would not have a notion of the other CCs in the network. In such systems, the additional CC information may be provided as part of the system information. For example, the current CC may provide the relevant information about the other CCs in the network. An idle UE on the single CC will then be able to read the relevant information concerning the other CCs.

In additional aspects of the present disclosure, an idle UE may detect and read such information about the other CCs by reading transmissions from other UEs. Alternatively, when periodically performing an inter-frequency search, the UE may read the system information of other cells in order to obtain the relevant additional CC information.

When determining the rate estimate for the DL in idle mode, the UE may determine the rate based on a channel state information (CSI) estimation, similar to rate estimation as performed in the connected mode. The UE would obtain the information about the reference signal on the other CCs that the UE could potentially use in the connected mode, and perform the CSI estimate on those CCs.

The resulting probability of choosing any particular WAN or WLAN may then be determined according to the equations:

$$P_{WAN} = \frac{\beta_{WAN}}{\beta_{WAN} + \beta_{WLAN}} \quad (2)$$

where $P_{WAN}$ represents the WAN connection probability, $\beta_{WLAN}$ provides a level of representation of the capacity of the WLAN network, and $\beta_{WAN}$ provides a level of representation of the capacity of the WAN network, and $$P_{WLAN} = \frac{\beta_{WLAN}}{\beta_{WAN} + \beta_{WLAN}} \quad (3)$$

where $P_{WLAN}$ represents the WLAN connection probability, where $P_{WLAN} = 1 - P_{WAN}$.

It should be noted that in alternative aspects of the present disclosure equations (2) and (3) may be modified in order to provide a greater bias towards a stronger system. In such equations, the relationship is determined as a ratio of exponential functions according to the equations:

$$P_{WAN} = \frac{e^{\beta_{WAN}}}{e^{\beta_{WAN}} + e^{\beta_{WLAN}}} \quad (4)$$

for enhanced WAN connection probability, and $$P_{WLAN} = \frac{e^{\beta_{WLAN}}}{e^{\beta_{WAN}} + e^{\beta_{WLAN}}} \quad (5)$$

for enhanced WLAN connection probability.

It should be noted that in various additional aspects of the present disclosure, additional biasing may be provided by introducing a biasing parameter, $\gamma$, to allow further biasing of the coefficient $\beta$ and provide additional flexibility or control in load balancing. In such aspects, equations (4) and (5) may be further modified as follows:

$$P_{WAN} = \frac{e^{\gamma_{WAN} \cdot \beta_{WAN}}}{e^{\gamma_{WAN} \cdot \beta_{WAN}} + e^{\gamma_{WLAN} \cdot \beta_{WLAN}}} = \frac{1}{1 + e^{\gamma_{WLAN} \cdot \beta_{WLAN} - \gamma_{WAN} \cdot \beta_{WAN}}} \quad (6)$$

for enhanced biased WAN connection probability, and $$P_{WLAN} = \frac{e^{\gamma_{WLAN} \cdot \beta_{WLAN}}}{e^{\gamma_{WAN} \cdot \beta_{WAN}} + e^{\gamma_{WLAN} \cdot \beta_{WLAN}}} = \frac{1}{1 + e^{\gamma_{WAN} \cdot \beta_{WAN} - \gamma_{WLAN} \cdot \beta_{WLAN}}} \quad (7)$$

for enhanced biased WLAN connection probability. The biasing parameter $\gamma$ may be set in order to bias the probability and, thus, bias the connection selection of a UE according to various methodologies. The biasing parameter $\gamma$ may be specified in standards specifications, may be broadcast from the operator network, or may be configured to be UE-specific. The various aspects of the present disclosure are not limited to any particular implementation of such a biasing parameter.

It should be noted that in additional aspects of the present disclosure, instead of defining the separate biasing parameter $\gamma$, the network may control the biasing by manipulating the value of the advertised loading coefficients of the networks. If the network determines, because of a particular load balancing goal, a desired balancing goal, the network may modify the measurement of cell load to reflect a value of loading coefficient that might bias cell selection in favor of the desired balancing goal. Thus, instead of broadcasting or advertising a loading coefficient that accurately reflects the measure of cell load, the network would broadcast or advertise the biased loading coefficient. The resulting $\beta$ values for the WAN/WLAN probability determinations will then reflect the desired loading scheme.

Figure 6:
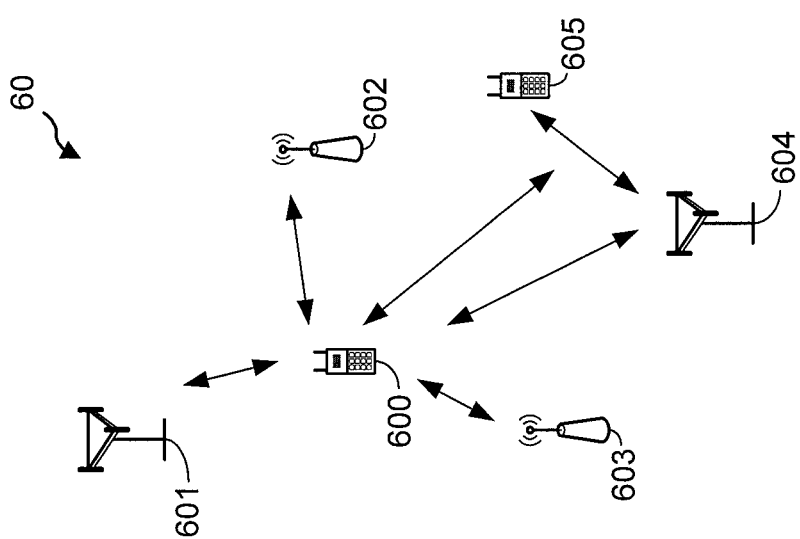
FIG. 6 is a block diagram illustrating a UE configured according to one aspect of the present disclosure.

When the probabilities are determined by the UE for the various WANs and WLANs detected, the UE may select which network to connect to based on those probabilities. FIG. 6 is a block diagram illustrating a UE 600 configured according to one aspect of the present disclosure. UE 600 is located in wireless network 60. The illustrated portion of wireless network 60 includes a base station 601 operating an access point to a first WAN, a second base station 604 operating an access point to a second WAN, access point 602 operating a first WLAN, and access point 603 operating a second WLAN. UE 600 is in an idle mode and detects the presence of base stations 601 and 604 and access points 602 and 603. In operating an aspect of the network selection process of the present disclosure, UE 600 determines the connection probability for each of base stations 601 and 604 and access points 602 and 603. The probabilities are determined according to the process and equations described above.

For example, depending on whether UL or DL connections are contemplated, UE 600 may select the appropriate value of $\alpha$ of equation (1) for determining the UL or DL version of the connection probability. UE 600 may receive the loading coefficients for each carrier from each of base stations 601 and 604 and access points 602 and 603. UE 600 may estimate the maximum supportable data rates on each carrier by measuring and analyzing various signal metrics of corresponding reference signals on the carriers. As noted above, UE 600 may not have information for any of the other component carriers that are not already associated with UE 600. Various methods may be used to obtain such information. For example, the component carrier to which UE 600 is associated may carry information on the other component carriers. Additionally, UE 600 may detect and read information on transmissions from neighboring UEs, such as UE 605. This information may include the information with regard to the other component carriers. UE 600 may also obtain information on the other component carriers by reading system information during scheduled inter-frequency cell searches.

Once the various parameters are obtained, UE 600 will then calculate the value of $\beta$ for each of WANs/WLANs operated by base stations 601 and 604 and access points 602 and 603. UE 600 would then determine the probability for each of the WANs/WLANs operated by base stations 601 and 604 and access points 602 and 603 as a ratio of the $\beta$ coefficients, according to selected ones of equations (2)-(7), using any additional biasing parameters or biasing means that are implemented by wireless network 60.

In order to select the particular WAN or WLAN for connection, UE 600 uses the determined connection probabilities. In one aspect, UE 600 calculates a connection selection probability using the determined connection probabilities as input. In such a process, a weighted, randomized decision is derived that will trigger UE 600 to select the resulting network. For example, in such an aspect, a WAN or WLAN that results in a low determined connection probability may still be selected for connection based on the results of the connection selection probability. In another aspect, UE 600 may compare the determined connection probabilities to various thresholds. If one particular WAN or WLAN results in the highest probability above the threshold, UE 600 may select to connect to that network. It should be noted that various methods may be implemented to use the determined connection probabilities in the selection of a more beneficial network.

Figure 7:
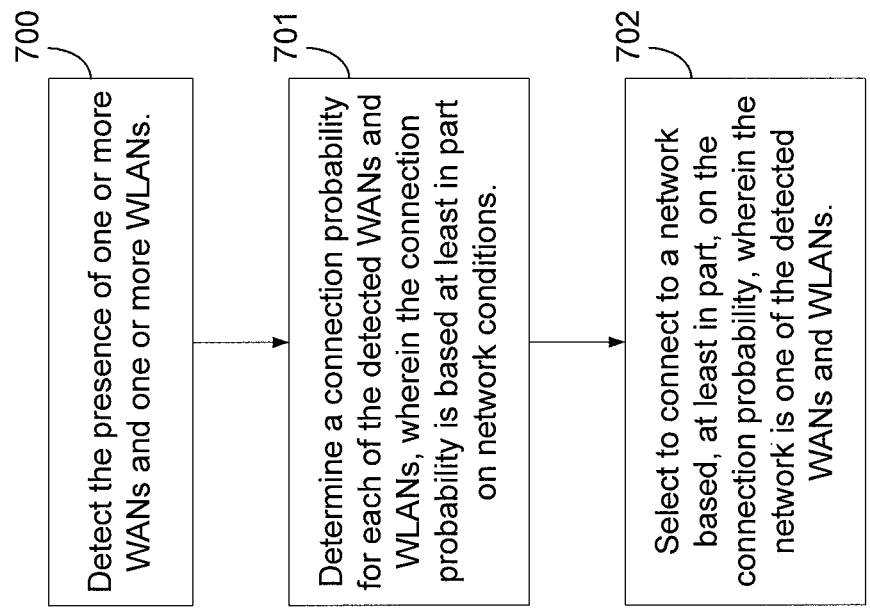
FIG. 7 is a functional block diagram illustrating example blocks executed to implement one aspect of the present disclosure.
Figure 8:
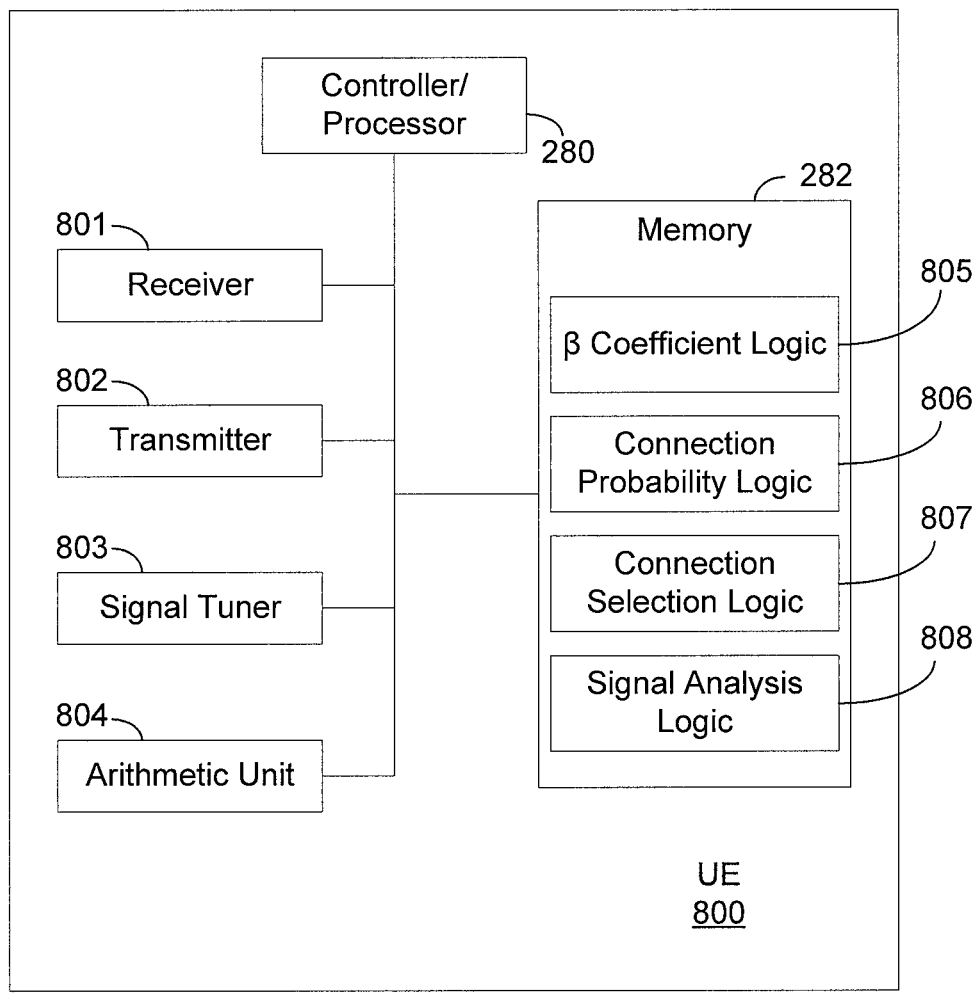
FIG. 8 is a block diagram illustrating a UE configured according to one aspect of the present disclosure.

FIG. 7 is a functional block diagram illustrating example blocks executed to implement one aspect of the present disclosure. At block 700, an idle-mode UE in a given location detects the presence of one or more WANs and one or more WLANs. With reference to FIG. 8, UE 800 receives various radio frequency (RF) signals through receiver 801. FIG. 8 is a block diagram illustrating UE 800 configured according to one aspect of the present disclosure. Receiver 801 may include multiple components and hardware, under control of controller/processor 280, such as, with reference to FIG. 2, antennas 252*a-r*, demodulator/modulators 254*a-r*, MIMO detector 256, and receiver processor 258. These components allow UE 800 to detect specific signals identifying the presence of the various WANs and WLANs.

At block 701, the UE determines a connection probability for each of the detected WANs and WLANs, where the connection probability reflects the network conditions. The UE, such as UE 800, begins to calculate a capacity coefficient for each of the WANs and WLANs, such as the $\beta$ coefficient calculated according to equation (1). UE 800, under control of controller/processor 280, accesses and executes $\beta$ coefficient logic 805 in memory 282, which implements the calculation of the coefficient for each such WAN and WLAN. Executing $\beta$ coefficient logic 805 accesses or determines parameters, such as a to determine UL or DL determinations, the minimum number of CCs available. $\beta$ coefficient logic 805 triggers UE 800 to obtain various signal metrics, through additional support of signal analysis logic 808, to determine signal metrics, such as pathloss, bandwidth, interference, transmission power, and the like of the reference signal of the additional CCs. The loading coefficients received from the network are used by $\beta$ coefficient logic 805 in calculating the capacity coefficient.

UE 800 may then access and execute connection probability logic 806 in memory 282. Using the capacity coefficient, the executing connection probability logic 806 determines a probability of connection for each of the detected WANs and WLANs. For example, connection probability logic 806 may use any of equations 2-7 in order to determine the connection probability. Each calculation of the capacity coefficient and connection probability being calculated using arithmetic unit 804, which may include well-known components and applications for adding, subtracting, and comparing various values.

At block 702, the UE selects to connect to a specific network based on the connection probabilities. UE 800 accesses and executes connection selection logic 807, under control of controller/processor 280, which takes the connection probabilities determined for each detected WAN and WLAN, and analyzes the connection probabilities for selection of the appropriate network out of the detected WANs and WLANs. As indicated above, the selection analysis may include generating a weighted randomized selection probability that uses the connection probabilities in the determination of the selected network. In another aspect, the resulting connection probabilities are more directly analyzed by the connection selection logic 807, such as by comparing the connection probabilities against threshold values using arithmetic unit 804. In response to this analysis of the connection probabilities, controller/processor 280 provides for UE 800 to connect to the selected network by causing signal tuner 803 to control the frequencies for transmitting connection signals over transmitter 802 to the selected network.

It is noted that although the aspects described with reference to FIGS. 1-7 have been described with reference to an idle-mode UE, the subject matter of the present disclosure may also be applied to a UE that is not in the idle-mode. For example, a UE (e.g., the UE 120 of FIGS. 1 and 2) may be connected to a first network (e.g., a first WLAN) via a first wireless access point (e.g., the femto cell 110*z* of FIG. 1). Using one or more of the aspects described with reference to FIGS. 5-8, the UE may determine a first probability of connection to a second network (e.g., a WAN) via a second wireless access point (e.g., the eNB 110*c* of FIG. 1) and a second probability of connection to a third network (e.g., a second WLAN) via a third wireless access point (e.g., the femto cell 110*y* of FIG. 1). The first probability and the second probability may be determined using equations one (1), two (2), and three (3). Based on the first probability of connection and the second probability of connection, the UE may select to connect to the second network via the second wireless access point or to connect to the third network via the third wireless access point. In an aspect, upon initiating the connection to the selected network, the UE may disconnect from the first network. In an aspect, the first probability of connection and the second probability of connection may be biased using a ratio of exponential functions as described with reference to equation four (4) or equation five (5) or may be biased using a biasing parameter as described with reference to equation six (6) or equation seven (7). In an additional aspect, the UE may also determine a third probability of connection to the first network. Based on the first probability of connection, the second probability of connection, and the third probability of connection, the UE may select to connect to the second network, connect to the third network, or to remain connected to the first network. Thus, one or more of the aspects of the present disclosure may be utilized by a UE to select a particular network for connection when UE is in idle-mode or when the UE is actively connected to and communicating with a network (e.g., when the UE is in a non-idle-mode).

Additionally, one or more aspects of the present disclosure may be used by a UE connected to one or more networks (e.g., one or more WLANs and/or one or more WANs) to steer traffic. For example, a UE (e.g., the UE 600 of FIG. 6) may be connected to a first network (e.g., the WLAN provided by the base station 601 of FIG. 6). Using one or more of the aspects described with reference to FIGS. 5-8, the UE may determine a first probability of connection to the first network, a second probability of connection to a second network (e.g., the WLAN provided by the base station 604 of FIG. 6), a third probability of connection to a third network (e.g., the WAN provided by the access point 602 of FIG. 6), and a fourth probability of connection to a fourth network (e.g., the WAN provided by the access point 603 of FIG. 6). The first probability of connection, the second probability of connection, the third probability of connection, and the fourth probability of connection may be determined using equations one (1), two (2), and three (3). Based on the first probability of connection, the second probability of connection, the third probability of connection, and the fourth probability of connection, the UE may determine whether to steer (e.g., route) traffic via the first network, via the second network, via the third network, or via the fourth network. If the UE is not connected to the particular network selected for steering the traffic, the UE may initiate a connection to the selected network. For example, if the particular network selected for steering the traffic is the second network, the UE may initiate a connection to the second network, and, upon establishing the connection to the second network, the UE may steer traffic via the connection to the second network. In an aspect, the first probability of connection and the second probability of connection may be biased using a ratio of exponential functions as described with reference to equation four (4) or equation five (5) or may be biased using a biasing parameter as described with reference to equation six (6) or equation seven (7). Thus, one or more of the aspects of the present disclosure may be utilized by a UE to steer traffic to a particular connection to a network.

In an additional aspect, the UE may be connected to multiple networks, and the UE may determine whether to steer the traffic to a particular one of the multiple networks to which the UE is connected. For example, the UE may be connected to the first network (e.g., the WLAN provided by the base station 601 of FIG. 6) and to the second network (e.g., the WAN provided by the access point 602 of FIG. 6). The UE may determine a first probability of connection to the first network and a second probability of connection to the second network. The first probability of connection and the second probability of connection may be determined using equations one (1), two (2), and three (3). Based on the first probability of connection and the second probability of connection, the UE may determine whether to steer (e.g., route) traffic via the connection to the first network or via the connection to the second network. In an aspect, the first probability of connection and the second probability of connection may be biased using a ratio of exponential functions as described with reference to equation four (4) or equation five (5) or may be biased using a biasing parameter as described with reference to equation six (6) or equation seven (7). Thus, in a particular aspect, the UE may only determine probabilities of connection for each of multiple networks to which the UE is connected and may use the determined probabilities to steer traffic via a connection to a particular one of the multiple networks. In an additional aspect, the UE may determine a third probability of connection to at least one network that the UE is not connected to, and may determine, based on the first probability of connection, the second probability of connection, and the third probability of connection, whether to steer the traffic via the first network, the second network, or the at least one network that the UE is not connected to. When the selected network is the at least one network that the UE is not connected to, the UE may initiate a connection to the selected network and may steer the traffic to the selected network after establishing the connection. When the selected network is the first network or the second network, the UE may steer the traffic to the selected network via a respective connection. Thus, in another aspect, the UE may determine probabilities of connection for each of multiple networks to which the UE is connected and probabilities of connection to at least one additional network that the UE is not connected to, and may use the determined probabilities to steer traffic via a connection to a particular network.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
detecting, at a mobile device, presence of one or more wide area networks (WANs) and one or more wireless local area networks (WLANs);
calculating a capacity coefficient for each of the one or more WANs and one or more WLANs, wherein each of the capacity coefficients is representative of the capacity of one of the one or more WANs or one of the one or more WLANs, wherein the capacity coefficient for each of the one or more WANs and one or more WLANs is calculated according to:

$$\beta = (\alpha) \sum_{i=1}^{N_{CC}^{DL}} l_i^{DL} R_i^{DL} + (1-\alpha) \sum_{i=1}^{N_{CC}^{UL}} l_i^{UL} R_i^{UL},$$

where $\beta$ is the capacity coefficient, $\alpha \in [0,1]$ is a parameter that considers uplink (UL)/downlink (DL) service requirements, such that the value of $\alpha$ determines whether the derivation of $\beta$ is related to DL or UL communication, $N_{CC}^{DL}$ and $N_{CC}^{UL}$ are the maximum number of component carriers (CCs) that may be aggregated at the mobile device for DL and UL communication, respectively, $l_i^{DL}$ and $l_i^{UL}$ are the loading coefficients for the DL and UL, respectively, of each carrier over the maximum CCs represented by $N_{CC}^{DL}$ and $N_{CC}^{UL}$, with a range of $l_i$ between 0 and 1, and $R_i^{DL}$ and $R_i^{UL}$ are the maximum supportable data rates on the $i^{th}$ DL and UL carrier, respectively, of each carrier over the maximum CCs;
determining, by the mobile device, a connection probability for at least one of the one or more WANs and for at least one of the one or more WLANs, wherein the connection probability is based at least in part on network conditions, wherein the connection probability for at least one of the one or more WANs and for at least one of the one or more WLANs according to:

$$P_{WAN} = \frac{\beta_{WAN}}{\beta_{WAN} + \beta_{WLAN}}, \text{ and}$$

$$P_{WLAN} = \frac{\beta_{WLAN}}{\beta_{WAN} + \beta_{WLAN}},$$

where $P_{WAN}$ represents the WAN connection probability for the at least one of the one or more WANs, $\beta_{WLAN}$ provides a level of representation of the capacity of the at least one WLAN network, $\beta_{WAN}$ provides a level of representation of the capacity of the at least one WAN network, $P_{WLAN}$ represents the WLAN connection probability for the at least one of the one or more WLANS, and where $P_{WLAN}=1-P_{WAN}$; and
selecting, by the mobile device, a network to connect to based, at least in part, on the connection probability, wherein the network is one of the one or more WANs and one or more WLANs.

2. The method of claim 1, wherein the capacity coefficient is calculated for at least one of: uplink connections and downlink connections.

3. The method of claim 1, wherein the capacity coefficient is based on a maximum number of component carriers available to the mobile device for connection.

4. The method of claim 3, wherein the maximum number of component carriers comprises a minimum of: a maximum number of component carriers which the mobile device is capable of connecting to and a maximum number of component carriers supported by the one or more WANs and one or more WLANs.

5. The method of claim 3, wherein the capacity coefficient is based on a loading coefficient of each component carrier of the maximum number of component carriers, wherein the loading coefficient is received at the mobile device from the one or more WANs and one or more WLANs.

6. The method of claim 3, wherein the capacity coefficient is based on a supportable data rate on each component carrier of the maximum number of component carriers.

7. The method of claim 6, further comprising:
measuring, by the mobile device, one or more signal metrics for a reference signal in each component carrier of the maximum number of component carriers; and
determining, at the mobile device, the supportable data rate based on the one or more signal metrics.

8. The method of claim 6, further comprising:
obtaining, at the mobile device, information on one or more component carriers of the maximum number of component carriers not currently associated with the mobile device.

9. The method of claim 8, wherein the obtaining comprises one of:
reading the information contained in a message carried by a component carrier currently associated with the mobile device;
reading the information contained in transmissions detected from one or more neighboring user equipment (UE) devices; and
reading system information that contains the information during a scheduled inter-frequency cell search by the mobile device.

10. The method of claim 1, wherein the determining the connection probability for each of the one or more WANs and one or more WLANs comprises determining a ratio of a first capacity coefficient to the capacity coefficients of the one or more WANs and one or more WLANs.

11. The method of claim 10, wherein the determining the ratio includes biasing the ratio to affect the connection probability.

12. The method of claim 10, wherein biasing the ratio includes one of:
determining the ratio according to an exponential function of the capacity coefficients;
determining the ratio using a biasing parameter; and
determining the ratio using a modified loading parameter received from the one or more WANs and one or more WLANs, wherein the modified loading parameter is modified to provide the biasing.

13. The method of claim 12, wherein the biasing parameter is one of:
known to the mobile device as a standard parameter;
received at the mobile device via a broadcast signal; and
configured specifically for the mobile device.

14. A mobile device configured for wireless communication, comprising:

means for detecting presence of one or more wide area networks (WANs) and one or more wireless local area networks (WLANs);
means for calculating a capacity coefficient for each of the one or more WANs and one or more WLANs, wherein each of the capacity coefficients is representative of the capacity of one of the one or more WANs or one of the one or more WLANs, wherein the capacity coefficient for each of the one or more WANs and one or more WLANs is calculated according to:

$$\beta = (\alpha)\sum_{i=1}^{N_{CC}^{DL}} l_i^{DL} R_i^{DL} + (1-\alpha)\sum_{i=1}^{N_{CC}^{UL}} l_i^{UL} R_i^{UL},$$

where $\beta$ is the capacity coefficient, $\alpha \epsilon [0,1]$ is a parameter that considers uplink (UL)/downlink (DL) service requirements, such that the value of $\alpha$ determines whether the derivation of $\beta$ is related to DL or UL communication, $N_{CC}^{DL}$ and $N_{CC}^{UL}$ are the maximum number of component carriers (CCs) that may be aggregated at the mobile device for DL and UL communication, respectively, $l_i^{DL}$ and $l_i^{UL}$ are the loading coefficients for the DL and UL, respectively, of each carrier over the maximum CCs represented by $N_{CC}^{DL}$ and $N_{CC}^{UL}$, with a range of $l_i$ between 0 and 1, and $R_i^{DL}$ and $R_i^{UL}$ are the maximum supportable data rates on the $i^{th}$ DL and UL carrier, respectively, of each carrier over the maximum CCs;

means for determining a connection probability for at least one of the one or more WANs and for at least one of the one or more WLANs, wherein the connection probability is based at least in part on network conditions, wherein the connection probability for at least one of the one or more WANs and for at least one of the one or more WLANs according to:

$$P_{WAN} = \frac{\beta_{WAN}}{\beta_{WAN} + \beta_{WLAN}}, \text{ and}$$

$$P_{WLAN} = \frac{\beta_{WLAN}}{\beta_{WAN} + \beta_{WLAN}},$$

where $P_{WAN}$ represents the WAN connection probability for the at least one of the one or more WANs, $\beta_{WLAN}$ provides a level of representation of the capacity of the at least one WLAN network, $\beta_{WAN}$ provides a level of representation of the capacity of the at least one WAN network, $P_{WLAN}$ represents the WLAN connection probability for the at least one of the one or more WLANS, and where $P_{WLAN}=1-P_{WAN}$; and
means for selecting a network to connect to based, at least in part, on the connection probability, wherein the network is one of the one or more WANs and one or more WLANs.

15. The mobile device of claim 14, wherein the capacity coefficient is calculated for at least one of: uplink connections and downlink connections.

16. The mobile device of claim 15, wherein the capacity coefficient is based on a maximum number of component carriers available to the mobile device for connection, and wherein the maximum number of component carriers comprises a minimum of: a maximum number of component carriers which the mobile device is capable of connecting to and a maximum number of component carriers supported by the one or more WANs and one or more WLANs.

17. The mobile device of claim 16, wherein the capacity coefficient is based on a loading coefficient of each component carrier of the maximum number of component carriers, wherein the loading coefficient is received at the mobile device from the one or more WANs and one or more WLANs.

18. The mobile device of claim 16, wherein the capacity coefficient is based on a supportable data rate on each component carrier of the maximum number of component carriers, wherein the mobile device of claim further comprises:
means for measuring one or more signal metrics for a reference signal in each component carrier of the maximum number of component carriers; and
means for determining the supportable data rate based on the one or more signal metrics.

19. The mobile device of claim 16, wherein the capacity coefficient is based on a supportable data rate on each component carrier of the maximum number of component carriers, wherein the mobile device further comprises:
means for obtaining information on one or more component carriers of the maximum number of component carriers not currently associated with the mobile device.

20. The mobile device of claim 19, wherein the means for obtaining comprises one of:
means for reading the information contained in a message carried by a component carrier currently associated with the mobile device;
means for reading the information contained in transmissions detected from one or more neighboring user equipment (UE) devices; and
means for reading system information that contains the information during a scheduled inter-frequency cell search by the mobile device.

21. The mobile device of claim 15, wherein the means for determining the connection probability for each of the one or more WANs and one or more WLANs comprises means for determining a ratio of a first capacity coefficient to the capacity coefficients of the one or more WANs and one or more WLANs.

22. The mobile device of claim 21, wherein the means for determining the ratio includes means for biasing the ratio to affect the connection probability, and wherein the means for biasing the ratio includes one of:
means for determining the ratio according to an exponential function of the capacity coefficients;
means for determining the ratio using a biasing parameter, wherein the biasing parameter is one of: known to the mobile device as a standard parameter, received at the mobile device via a broadcast signal, and configured specifically for the mobile device; and
means for determining the ratio using a modified loading parameter received from the one or more WANs and one or more WLANs, wherein the modified loading parameter is modified to provide the means for biasing.

23. A non-transitory computer-readable medium having program code stored thereon, wherein the program code, when executed by a computer, causes the computer to:
detect, at a mobile device, presence of one or more wide area networks (WANs) and one or more wireless local area networks (WLANs);
calculate a capacity coefficient for each of the one or more WANs and one or more WLANs, wherein each of the capacity coefficients is representative of the capacity of one of the one or more WANs or one of the one or more WLANs, wherein the capacity coefficient for each of the one or more WANs and one or more WLANs is calculated according to:

$$\beta = (\alpha) \sum_{i=1}^{N_{CC}^{DL}} l_i^{DL} R_i^{DL} + (1-\alpha) \sum_{i=1}^{N_{CC}^{UL}} l_i^{UL} R_i^{UL},$$

where $\beta$ is the capacity coefficient, $\alpha \in [0,1]$ is a parameter that considers uplink (UL)/downlink (DL) service requirements, such that the value of $\alpha$ determines whether the derivation of $\beta$ is related to DL or UL communication, $N_{CC}^{DL}$ and $N_{CC}^{UL}$ are the maximum number of component carriers (CCs) that may be aggregated at the mobile device for DL and UL communication, respectively, $l_i^{DL}$ and $l_i^{UL}$ are the loading coefficients for the DL and UL, respectively, of each carrier over the maximum CCs represented by $N_{CC}^{DL}$ and $N_{CC}^{UL}$, with a range of $l_i$ between 0 and 1, and $R_i^{DL}$ and $R_i^{UL}$ are the maximum supportable data rates on the $i^{th}$ DL and UL carrier, respectively, of each carrier over the maximum CCs;
determine, by the mobile device, a connection probability for at least one of the one or more WANs and for at least one of the one or more WLANs, wherein the connection probability is based at least in part on network conditions, and wherein the connection probability for at least one of the one or more WANs and for at least one of the one or more WLANs according to:

$$P_{WAN} = \frac{\beta_{WAN}}{\beta_{WAN} + \beta_{WLAN}}, \text{ and}$$

$$P_{WLAN} = \frac{\beta_{WLAN}}{\beta_{WAN} + \beta_{WLAN}},$$

where $P_{WAN}$ represents the WAN connection probability for the at least one of the one or more WANs, $\beta_{WLAN}$ provides a level of representation of the capacity of the at least one WLAN network, $\beta_{WAN}$ provides a level of representation of the capacity of the at least one WAN network, $P_{WLAN}$ represents the WLAN connection probability for the at least one of the one or more WLANS, and where $P_{WLAN} = 1 - P_{WAN}$; and
select, by the mobile device, a network to connect to based, at least in part, on the connection probability, wherein the network is one of the one or more WANs and one or more WLANs.

24. The non-transitory computer-readable medium of claim 23, wherein the capacity coefficient is based on a maximum number of component carriers available to the mobile device for connection.

25. The non-transitory computer-readable medium of claim 24, wherein the maximum number of component carriers comprises a minimum of: a maximum number of component carriers which the mobile device is capable of connecting to and a maximum number of component carriers supported by the one or more WANs and one or more WLANs.

26. The non-transitory computer-readable medium of claim 24, wherein the capacity coefficient is based on a loading coefficient of each component carrier of the maximum number of component carriers, wherein the loading coefficient is received at the mobile device from the one or more WANs and one or more WLANs.

27. The non-transitory computer-readable medium of claim 24, wherein the capacity coefficient is based on a supportable data rate on each component carrier of the maximum number of component carriers.

28. A mobile device configured for wireless communication, comprising:
   at least one processor; and
   a memory coupled to the at least one processor, wherein the at least one processor is configured to:
      detect, at the mobile device, presence of one or more wide area networks (WANs) and one or more wireless local area networks (WLANs);
      calculate a capacity coefficient for each of the one or more WANs and one or more WLANs, wherein each of the capacity coefficients is representative of the capacity of one of the one or more WANs or one of the one or more WLANs, wherein the capacity coefficient for each of the one or more WANs and one or more WLANs is calculated according to:

$$\beta = (\alpha)\sum_{i=1}^{N_{CC}^{DL}} l_i^{DL} R_i^{DL} + (1-\alpha)\sum_{i=1}^{N_{CC}^{UL}} l_i^{UL} R_i^{UL},$$

where $\beta$ is the capacity coefficient, $\alpha \epsilon [0,1]$ is a parameter that considers uplink (UL)/downlink (DL) service requirements, such that the value of $\alpha$ determines whether the derivation of $\beta$ is related to DL or UL communication, $N_{CC}^{DL}$ and $N_{CC}^{UL}$ are the maximum number of component carriers (CCs) that may be aggregated at the mobile device for DL and UL communication, respectively, $l_i^{DL}$ and $l_i^{UL}$ are the loading coefficients for the DL and UL, respectively, of each carrier over the maximum CCs represented by $N_{CC}^{DL}$ and $N_{CC}^{UL}$, with a range of $l_i$ between 0 and 1, and $R_i^{DL}$ and $R_i^{UL}$ are the maximum supportable data rates on the $i^{th}$ DL and UL carrier, respectively, of each carrier over the maximum CCs;
      determine, by the mobile device, a connection probability for at least one of the one or more WANs and for at least one of the one or more WLANs, wherein the connection probability is based at least in part on network conditions, wherein the connection probability for at least one of the one or more WANs and for at least one of the one or more WLANs according to:

$$P_{WAN} = \frac{\beta_{WAN}}{\beta_{WAN} + \beta_{WLAN}}, \text{ and}$$

$$P_{WLAN} = \frac{\beta_{WLAN}}{\beta_{WAN} + \beta_{WLAN}},$$

where $P_{WAN}$ represents the WAN connection probability for the at least one of the one or more WANs, $\beta_{WLAN}$ provides a level of representation of the capacity of the at least one WLAN network, $\beta_{WAN}$ provides a level of representation of the capacity of the at least one WAN network, $P_{WLAN}$ represents the WLAN connection probability for the at least one of the one or more WLANS, and where $P_{WLAN}=1-P_{WAN}$; and
      select, by the mobile device, a network to connect to based, at least in part, on the connection probability, wherein the network is one of the one or more WANs and one or more WLANs.

* * * * *